United States Patent [19]

Colas et al.

[11] 4,425,059

[45] Jan. 10, 1984

[54] PROCESS FOR REMOVING A CONCRETE COVERING

[75] Inventors: Claude Colas, Notre Dame des Landes; Guy Herve, Nantes; Jean-Louis M. Caputi; Bruno de Sivry, both of Paris, all of France

[73] Assignee: Compagnie Francaise des Petroles, Paris, France

[21] Appl. No.: 320,031

[22] Filed: Nov. 10, 1981

[30] Foreign Application Priority Data

Nov. 13, 1980 [FR] France ................................ 80 24104

[51] Int. Cl.[3] ............................................. B23B 35/00

[52] U.S. Cl. ...................................... 408/1 R; 125/1; 409/132

[58] Field of Search ...................... 408/12, 1; 409/132; 125/1

[56] References Cited

U.S. PATENT DOCUMENTS

| | | | |
|---|---|---|---|
| 2,629,164 | 2/1953 | Pridy | 409/132 |
| 3,293,952 | 12/1966 | Fairbanks | 408/1 |
| 3,678,802 | 7/1972 | Butter | 409/132 |
| 4,327,703 | 5/1982 | Destree | 125/23 R |

*Primary Examiner*—Harold D. Whitehead

*Attorney, Agent, or Firm*—Sughrue, Mion, Zinn, Macpeak & Seas

[57] ABSTRACT

The invention concerns the removal of a concrete covering applied to an underlying surface provided with an anti-corrosion coating, for example that of a hydrocarbon-conveying pipe.

The coating is removed by making trenches in the concrete to divide it into removable elements, the trenches being made using a cylindrical milling cutter having a longitudinal diamond-faced toothing and provided with a central stud of tungsten carbide projecting axially from the end of the cutter. In use the stud contacts the surface to prevent the surface being damaged by the toothing on the cutter as the cutter is moved transversely across the surface. To initiate a concrete covering removal operation, a hole is first drilled through the covering perpendicular to the surface for receiving the stud. The cutter is then moved perpendicularly to the surface through the concrete with the stud projecting into the drilled hole and until the stud contacts the surface. The cutter is then moved transversely over the surface to form the trenches.

8 Claims, 6 Drawing Figures

PROCESS FOR REMOVING A CONCRETE COVERING

The invention relates to the removal of a concrete covering on an underlying surface, particularly on a metal pipe, and more particularly on a hydrocarbon-conveying pipeline, covered with an anti-corrosion coating which in turn is covered with a covering of concrete.

It is known that this concrete covering can be removed by dividing it by means of trenches into elements (shells in the case of a pipe), which are then individually removed. These trenches may be obtained by one of the two following techniques known at the present time: the application of a high-pressure jet which acts only on the concrete and which must be followed by the shearing of any reinforcements embedded in the concrete—a technique which in the case of a submerged pipe also entails the disadvantage of requiring the installation of a hydraulic umbilical connection between the bed and the surface and of giving rise to differences in operation depending on the depth; and the utilisation of rotary diamond-faced discs which cut through both the concrete and any metal reinforcements which may be encountered, but which wear out rapidly and whose wear is difficult to monitor. These two techniques, with which it is difficult for an operator to avoid damaging the surface lying under the concrete and under the anti-corrosion coating, are completely unsuitable for the automation of the process.

According to one aspect of the invention there is provided a process for removing a concrete covering on a surface provided with an anti-corrosion coating comprising making trenches in the concrete covering to divide the covering into removable elements, wherein the trenches are produced by means of at least one milling cutter of generally cylindrical shape with a circular terminal base, which has a longitudinal toothing distributed over the cylindrical portion and is provided with a stud projecting axially at the centre of the circular terminal base, which milling cutter is displaced transversely after a preliminary hole of a diameter larger than that of the stud has first been made in the concrete covering, at right angles to the surface, and the milling cutter has been inserted perpendicularly to the surface through the entire thickness of the concrete covering while advancing the stud in this preliminary hole.

During the milling operation the stud bears against the underlying surface and prevents that surface from being cut by the milling cutter.

The preliminary hole advantageously has a diameter smaller than the diameter of the milling cutter, and the longitudinal toothing of the latter is extended over the circular terminal base by frontal toothing, which remains set back axially in relation to the stud, in such a manner that this frontal toothing bores out the preliminary hole originally formed, in order to permit the introduction of the milling cutter into the concrete covering.

The operation of drilling the preliminary hole, which may be effected with the aid of a percussion drill equipped with a tungsten carbide drill bit, is halted when the bit has penetrated into the anti-corrosion coating. This penetration can be detected by measuring the power of the drill drive motor or by measuring vibrations, but it is preferred to monitor the speed of advance of the drill bit and to stop the drilling as soon as an abrupt acceleration of this speed is detected.

The force applied, perpendicularly to the surface, to the milling cutters should not be too great, and is preferably between about 300 and 500 newtons.

The circumferential speed of the milling cutters is advantageously of the order of 38 meters per second.

It has been found that it is preferable to fix the transverse thrust of the milling cutters and not their rate of transverse advance, which adjusts itself in accordance with the local composition of the concrete covering. With customary concrete coverings a transverse thrust of the order of 1000 newtons is preferred.

According to another aspect of the invention there is provided a milling cutter for use in carrying out the above described process, comprising a cylindrical portion with a circular terminal base, longitudinal diamond-faced toothing distributed over the cylindrical portion, and a stud of tungsten carbide which projects axially from the centre of the circular terminal base.

At least some of the teeth of the longitudinal toothing are preferably extended on the circular terminal base in order to form a front toothing.

Contrarily to what might be assumed, it was found preferable for the stud to be rotationally fixed to the milling cutter carrying it, in order to prevent seizing. The stud is preferably arched.

The diamond-faced toothing may be formed of a diamond-containing concretion, composed in particular of particles of diamond embedded in a binder, and having a thickness of about 5 mm.

Other features of the invention will become apparent from the following description of embodiments, given by way of example only, with reference to the accompanying drawings, in which.

Figure 1:
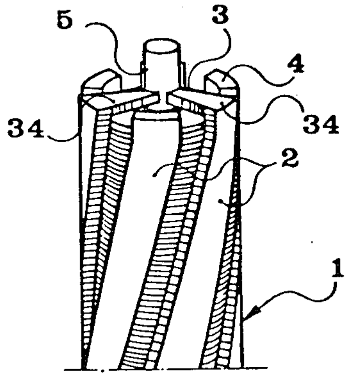
FIG. 1 is a view in perspective of a milling cutter.

The milling cutter 1 shown in FIG. 1 has a generally cylindrical shape with a diameter of the order of 46 mm, with projecting longitudinal bands 2, which here are helical but which could also be straight, and with a circular terminal base 3 from which project axially, on the one hand, frontal extensions 4 of the bands 2 and, on the other hand, an attached stud 5 firmly fixed to the milling cutter 1. Some of the frontal extensions 4 (one out of two in the case of FIG. 1) have radial portions 34 extending over the base of the milling cutter.

The stud preferably projects beyond the frontal extensions 4 by a height substantially equal to the thickness of the anti-corrosion coating of the surface which is to be stripped of concrete, that is to say about one to five millimeters.

The bands 2 and their extensions 4 are provided with a covering of a diamond-containing concretion.

Figure 2:
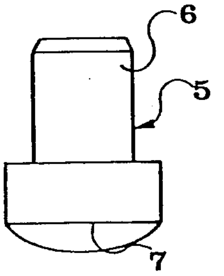
FIGS. 2 and 3 are views in elevation on a larger scale of two embodiments of studs which can be attached to this milling cutter.
Figure 3:
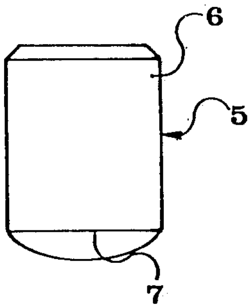

The stud 5, embodiments of which are shown on a larger scale in FIGS. 2 and 3, comprises a fastening shank 6 and a tungsten carbide tip 7 of a diameter of 12 to 16 mm, the tip 7 being ground to an arched or convex profile in order not to mark the pipe. This tip may for example have a total thickness of 7 mm, with 2 mm for the arched portion.

Figure 4:
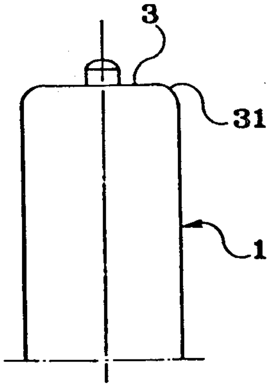
FIG. 4 is a view of the general profile which the milling cutter may have.

The transition 31 between the cylindrical surface of the cutter 1 and its base 3 may be radiused, as shown in FIG. 4.

Figure 5:
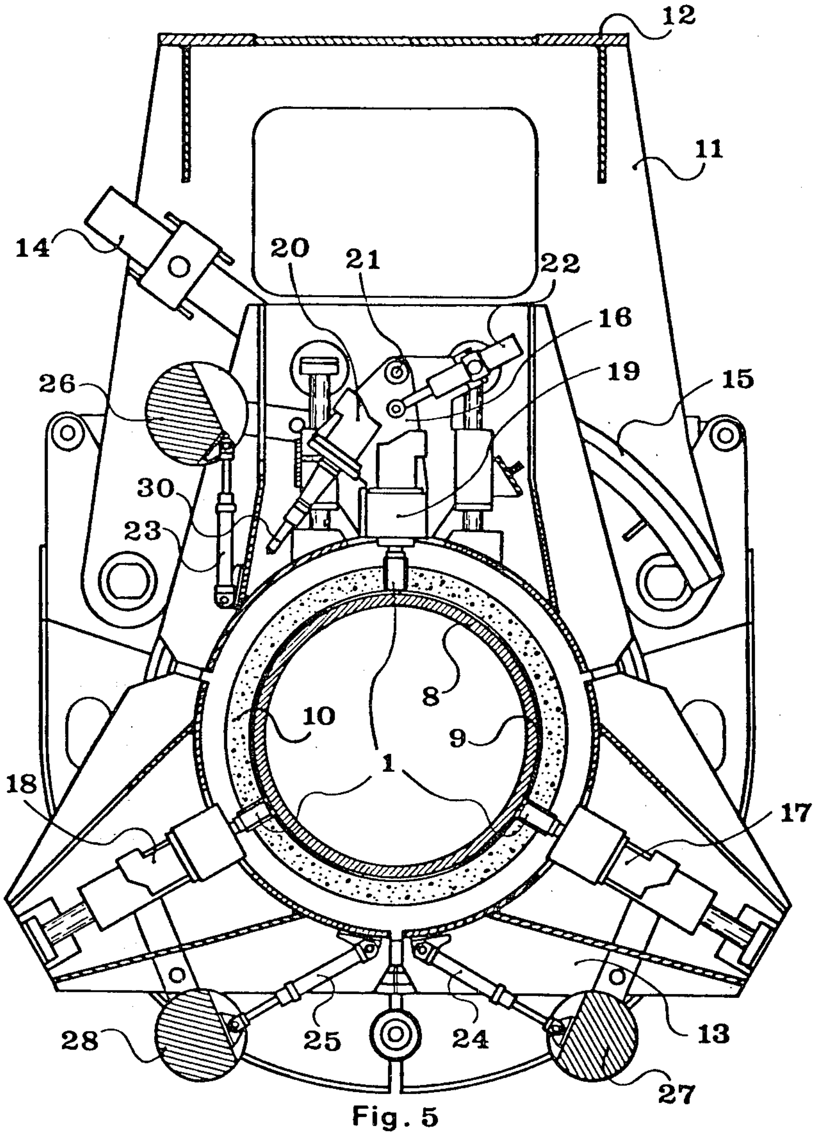
FIG. 5 is a view in partial cross-section of a machine removing the concrete covering of a pipe.

FIG. 5 shows in cross-section a steel pipe 8 coated with an anti-corrosion coating 9, which in turn is covered by a concrete covering 10. A frame 11, which can be attached by a top part 12 to a carriage (not shown) adapted to be displaced longitudinally parallel to the axis of the pipe 8, is provided with a circular rail (not shown), in which can be displaced a rotary cage 13 consisting of three parts and driven rotationally over a sector of at least 120° by a jack system driving a gear rolling between a fixed rack and a movable rack, the jack 14 and the fixed rack 15 of this system being visible in the figure. This rotary cage 13 holds three machine-tool supports 16, 17, and 18. The supports 17, 18 are simply in the form of milling machine supports, on which are mounted milling cutters such as the milling cutter 1. The support 16 is more complex, because it carries not only a milling machine 19 but also a drill 20, the milling machine and the drill being oriented in different directions, and the mounting device of these two machines is adapted to turn about an axis 21 under the action of a jack 22. The drilling machine 20 is thus first adjusted to the radial direction in order to make a preliminary hole in the concrete 10, and then the milling machine 19 is adjusted to the radial direction in order to cause a milling cutter, such as the cutter 1, to penetrate into the concrete in the direction of the axis of this preliminary hole, whereupon a circular displacement of the cage 13 of more than 60° on one side and more than 60° on the other side forms in the concrete a trench of sufficient length to enable the cutter 1 of one of the milling machines 17,18 to penetrate into it and extend this trench by about 120°. The cutter 1 of the other milling machine 17 or 18 thereupon completes the circular trench over the remaining sector of about 120°. After this operation the three milling machines can work simultaneously, while being displaced in the longitudinal direction of the pipe 8 through the displacement of the frame 11, and can continue to work simultaneously while being displaced circularly with the cage 13, in such a manner as to cut out shells from the concrete; these successive longitudinal and circular displacements are continued until the entire length of pipe which is to be stripped of concrete has been divided up by a grid of trenches, thus making it possible to remove the concrete shells from the pipe.

The force applied radially to the cutters is regulated by jacks 23, 24, 25, while counterweights 26, 27, 28 permit compensation for variations of this radial force due to the weight of the machine tools, so that it is possible to maintain an almost constant radial application force of the cutters during the rotation of the milling machines of 0° to 120° around the pipe.

Figure 6:
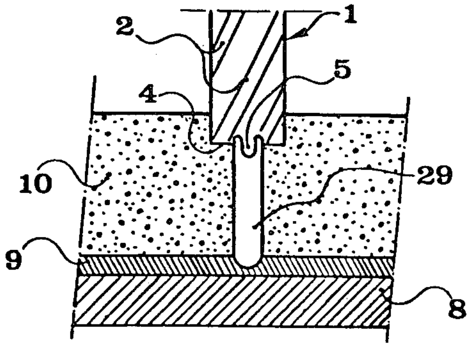
FIG. 6 is a partial section showing the entry of the milling cutter into the concrete covering.

FIG. 6 shows a preliminary hole 29 previously made, as explained above, by means of a tungsten carbide drill bit, such as that visible at 30 in FIG. 5. In FIG. 6 the milling cutter 1 can be seen in the course of the boring out of the preliminary hole 29.

There is thus provided a process and apparatus for removing the concrete covering of a surface with the certainty that the underlying surface will not be damaged and which lends itself readily to automation.

What is claimed is:

1. A process for removing a concrete covering on a surface provided with an anti-corrosion coating which is covered with a covering of concrete, comprising making trenches in said concrete covering so as to divide said covering into elements which are then detached from said surface, said trenches being made by at least one milling cutter having a generally cylindrical portion with a circular terminal base and comprising longitudinal toothing distributed over said cylindrical portion and a stud projecting axially from the centre of said circular terminal base, wherein a preliminary hole of a diameter larger than that of said stud is first made in said concrete covering at right angles to said surface, said milling cutter is then moved perpendicularly to said surface through the thickness of said concrete covering while said stud is advanced in said preliminary hole, and said milling cutter is then displaced transversely along said surface.

2. A process according to claim 1, wherein said preliminary hole has a diameter larger than that of said stud but smaller than the outside diameter of said cylindrical portion of said milling cutter, and said longitudinal toothing of said milling cutter is extended on said circular terminal base by frontal toothing.

3. A process according to either claim 1 or claim 2, wherein the operation of drilling said preliminary hole is halted in accordance with the indication of an abrupt acceleration of the speed of advance of the tool effecting said operation.

4. A process according to claim 1 wherein the force applied to said milling cutter perpendicularly to said surface is between about 300 and 500 newtons.

5. A process according to claim 1 wherein the circumferential speed of said milling cutter is of the order of 28 meters per second.

6. A process according to claim 1 wherein the transverse thrust of said milling cutter is kept constant.

7. A process according to claim 6, wherein said transverse thrust is of the order of 1000 newtons.

8. A process according to claim 1 wherein said milling cutter has a stud having a height substantially equal to the thickness of said anti-corrosion coating.

* * * * *